United States Patent [19]

Kim

[11] Patent Number: 4,925,183
[45] Date of Patent: May 15, 1990

[54] INDOOR-ROLLBIKE APPARATUS

[76] Inventor: Sang-Sup Kim, 178 E. Columbia Ave., Des Plaines, Ill. 60016

[21] Appl. No.: 56,856

[22] Filed: Jun. 1, 1987

[51] Int. Cl.⁵ ..................... A63B 21/00; G09B 9/04
[52] U.S. Cl. ..................................... 272/73; 434/61
[58] Field of Search ............... 272/73, 69; 434/61, 434/247, 255

[56] References Cited

U.S. PATENT DOCUMENTS

| 554,754 | 2/1896 | Webber | 272/73 |
|---|---|---|---|
| 581,835 | 5/1897 | Sturgis | 272/73 |
| 3,940,128 | 2/1976 | Ragone | 272/73 |
| 4,079,931 | 3/1978 | Valentine | 272/73 |
| 4,082,265 | 4/1978 | Berkes | 272/73 |
| 4,415,152 | 11/1983 | Smith | 272/73 |
| 4,580,983 | 4/1986 | Cassini et al. | 434/61 |
| 4,673,177 | 6/1987 | Szymski | 272/73 |
| 4,673,178 | 6/1987 | Dwight | 272/73 |
| 4,674,742 | 6/1987 | Baatz | 272/73 |

FOREIGN PATENT DOCUMENTS

| 0121186 | 10/1984 | European Pat. Off. | 272/73 |
|---|---|---|---|
| 99657 | 1/1898 | Fed. Rep. of Germany | 272/73 |

Primary Examiner—Richard J. Apley
Assistant Examiner—S. R. Crow
Attorney, Agent, or Firm—Charles F. Lind

[57] ABSTRACT

A conventional bicycle is mounted and restrained for exercise on a treadmill frame. A motion-coordinator system is connected to the bicycle and permits free motion of the front wheel and limited lateral tilting of the bicycle. Roller type lateral stops prevent a rider from riding off the treadmill. Irregularities in the treadmill surface provide a road surface simulation.

6 Claims, 7 Drawing Sheets

FIG. 1
FIG. 2
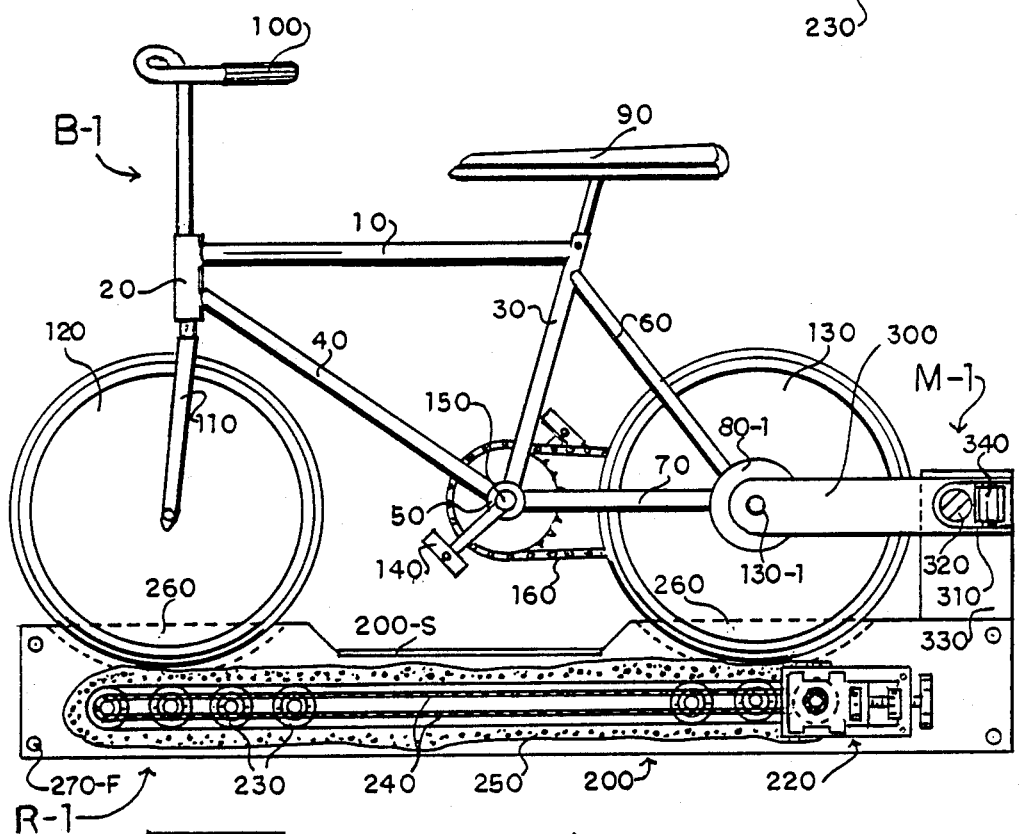
FIG. 4
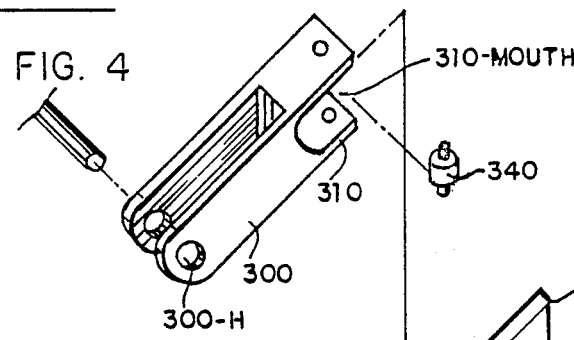
FIG. 3
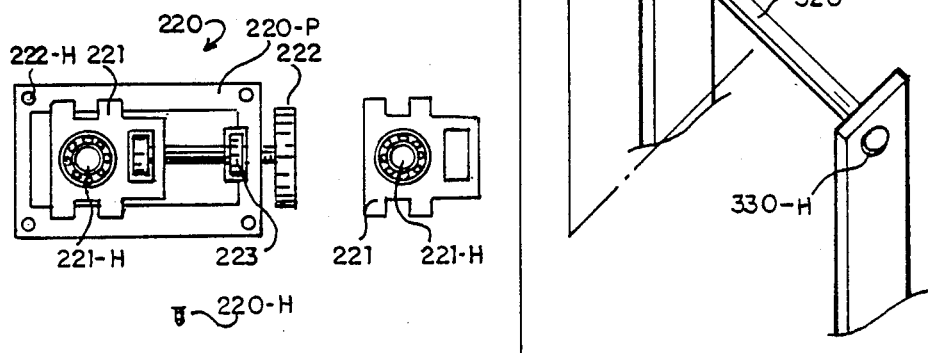

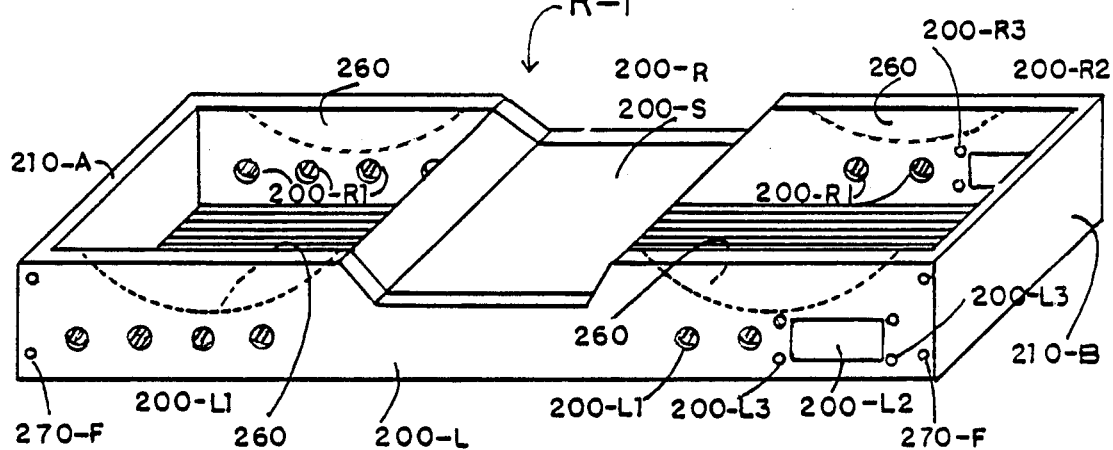
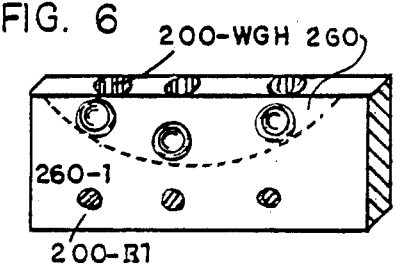
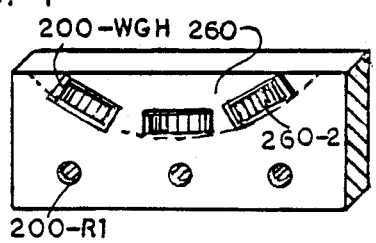
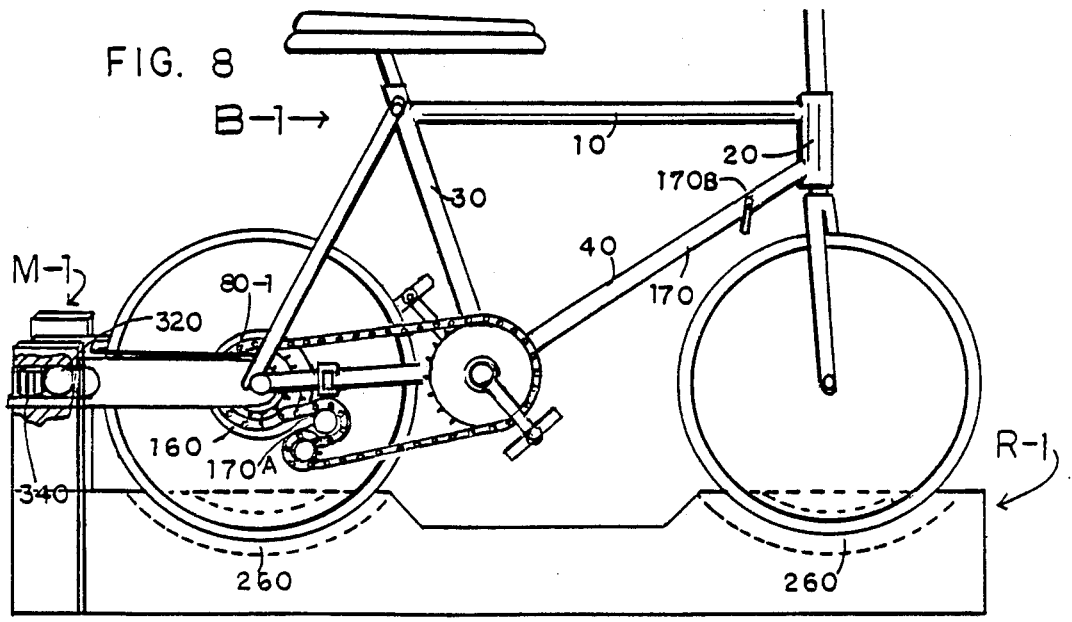

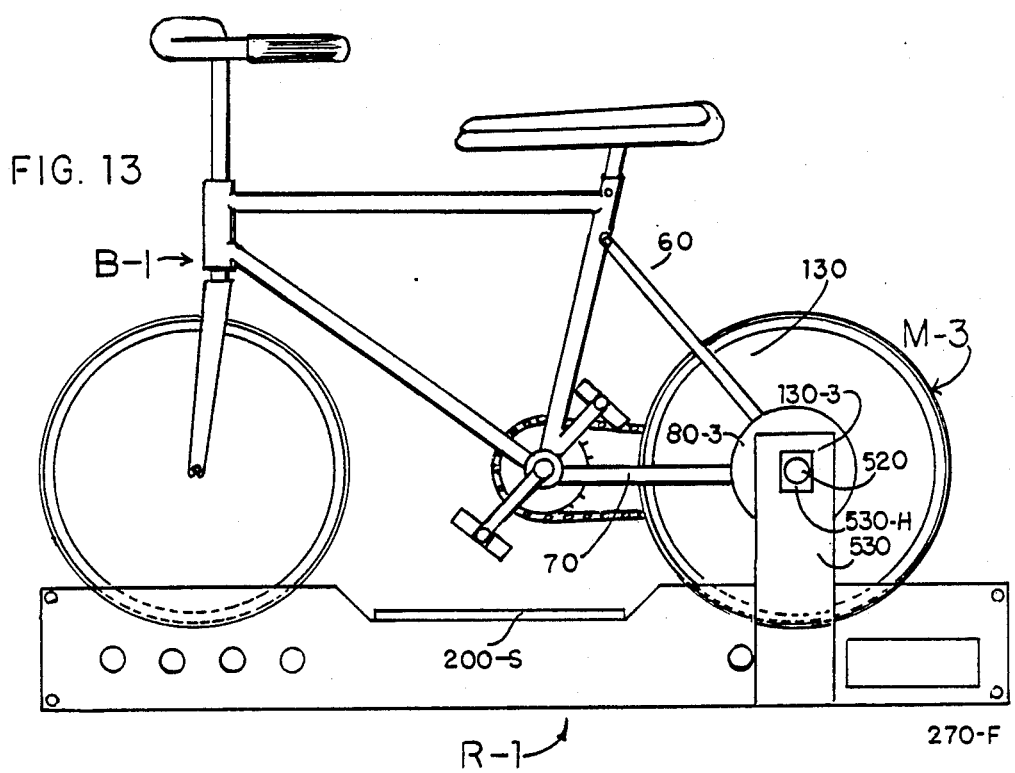
FIG. 13
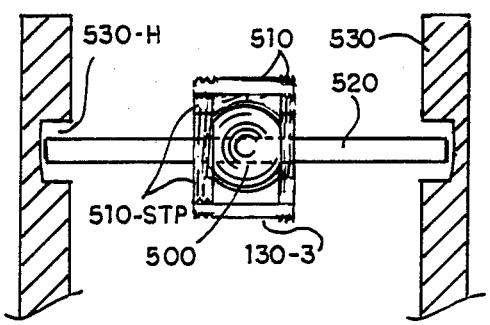
FIG. 14A
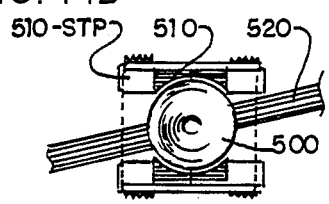
FIG. 14B
FIG. 14D
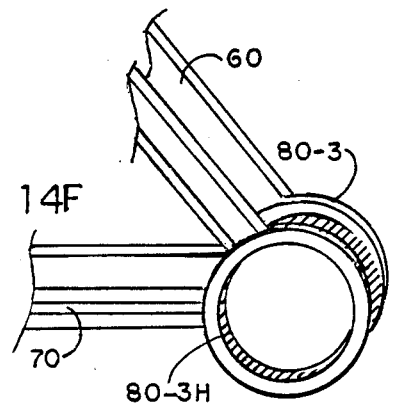
FIG. 14F
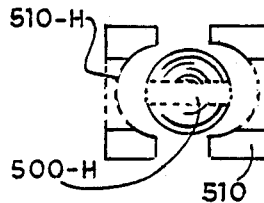
FIG. 14C
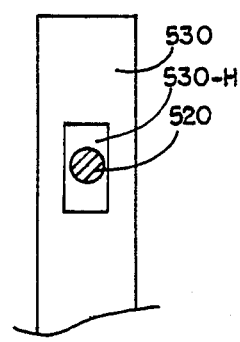
FIG. 14E

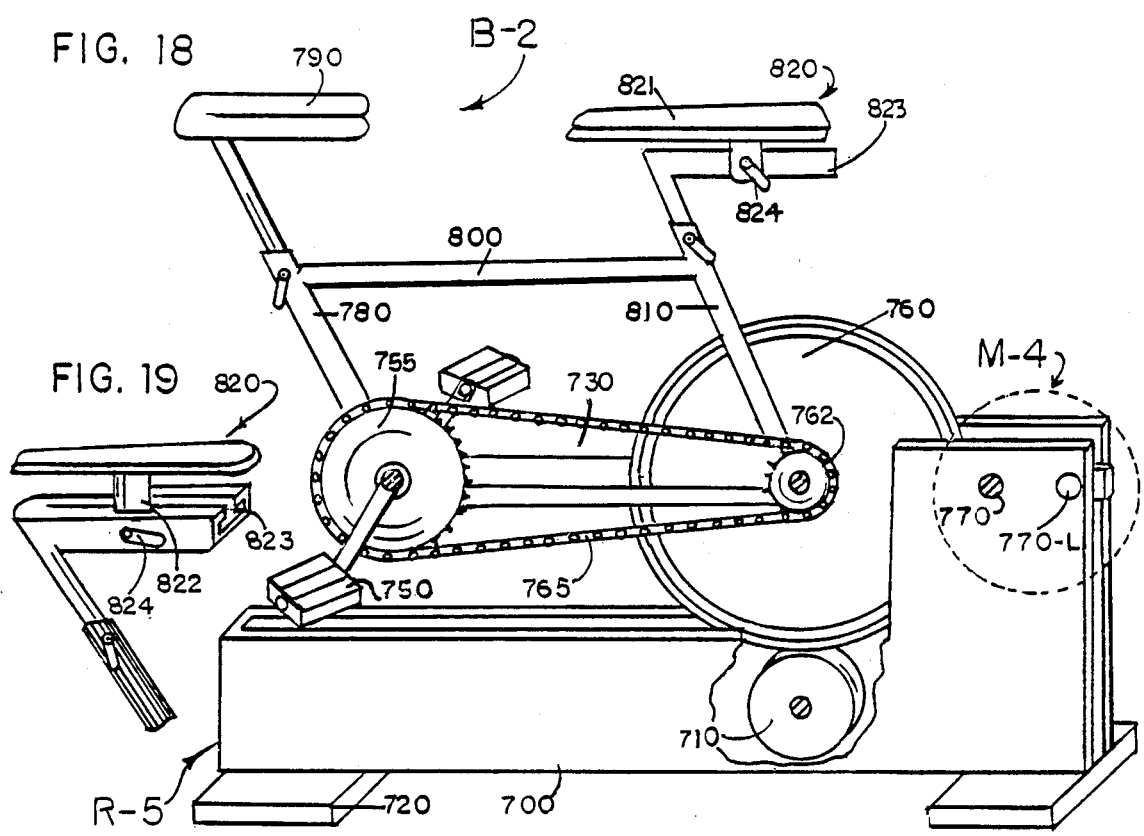
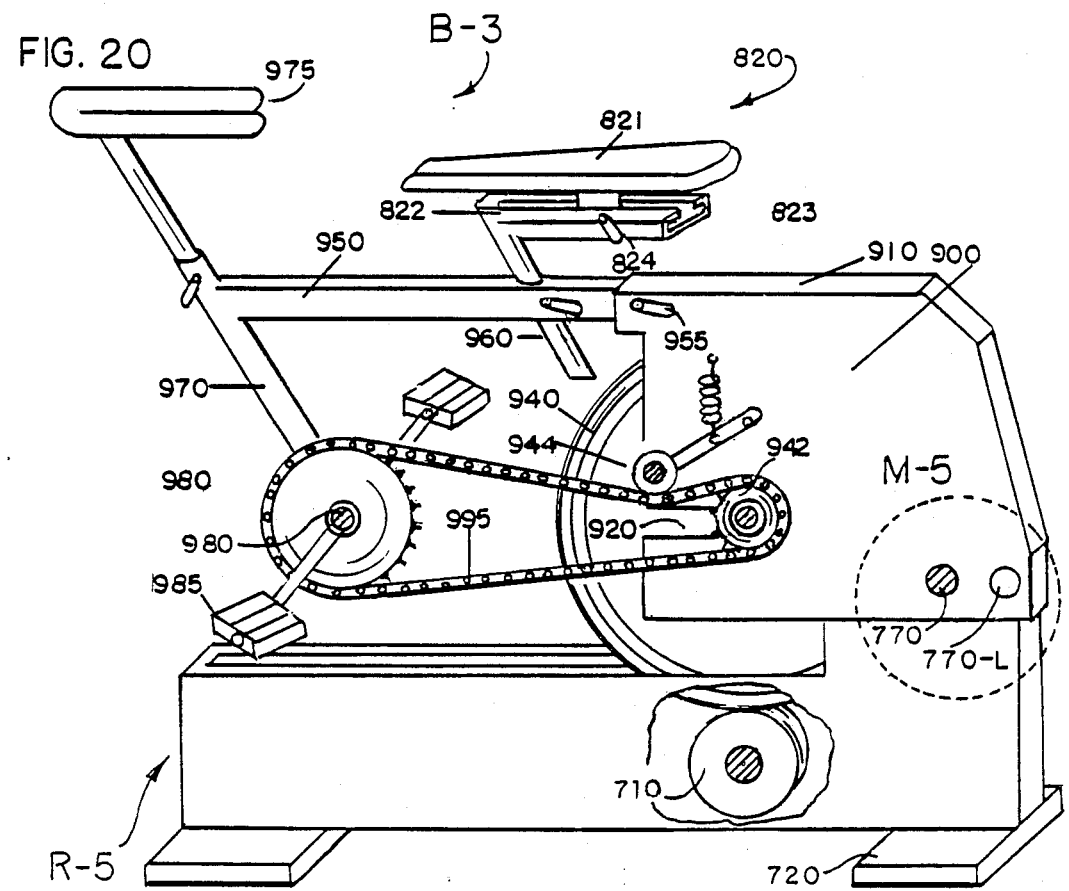

INDOOR-ROLLBIKE APPARATUS

BACKGROUND OF INVENTION

1. Field of Invention

The present invention relates to an exercising apparatus, and more particularly, to a device wherein a bike unit rolls on a road device unit when pedaled by the rider, and is steered by functional handlebars and needs to be balanced.

2. Description of the Prior Art

Heretofore, bicycle type exercising apparatus have been constructed to operate as a parked bicycle, with the wheels off the ground, and drag wheel members or braking means provide a resistance against which the rider has to pedal. The wheel rolls in the air, not on a road means, and such exercising is very monotonous.

On the contrary, the present invention, consisting of a bike unit, a road device unit, and a motion coordinator means, has the rider do more than just pedal; but while the rider pedals, the bike unit must also be steered and kept in balance, thus causing the rider to move his body, voluntarily and involuntarily.

Although the bike unit cannot fall off the road device unit or fall down completely, care must be taken to keep the bike unit upright and rolling. Keeping one's balance is a great part of riding a bicycle, as the torso must constantly move to account for the different position of the legs when pedaling, and for the different positions of the handlebars, etc. This forces the stomach, the back and the rest of the body to constantly make adjustments and thereby exercise. Controlling the handlebars is also important in providing exercises for the arms, shoulders and the back, while pedaling, when keeping balance and also while turning. The present invention also provides greater pleasure to the rider, therefore increasing the likely frequency of exercising for greater overall benefit.

No known commercial bicycle type exercising apparatus has incorporated the important features and functions of actual bicycle riding, including: handlebars that can be moved and steered, wheels that roll over a simulated road surface while providing a feedback of the road surface, and rider input to keep the apparatus in balance, and all while in a limited area, indoors or outdoors. This invention will simulate these important features of riding a bicycle, thereby giving the benifits of riding while increasing the pleasures of exercising.

SUMMARY OF THE INVENTION

The invention relates to a stationary exercising apparatus utilizing a bicycling device which enables the rider to achieve the results of riding a bicycle, complete with functional pedals and handlebars, wheels that roll over a simulated road surface, and the need to steer to keep one's balance.

This invention includes a road device unit and a motion coordinator means, an a bike unit coupled to the road device unit by the motion-coordinator means. The road device unit provides the various road conditions over which the bike unit rolls, and the motion coordinator means allows the bike unit sufficient degrees of freedom to steer in keeping the bike unit balanced on the road device unit.

It follows that objects of the present invention are:

(1) to provide a novel and improved indoor apparatus to be used with a bicycle type of device for exercising the many muscles throughout the entire body that are normally exercised when riding a bicycle outdoors, but while riding indoors; and to do so in a manner that is enjoyable and restful for the mind;

(2) to provide an ideal all-weather exercising device, as a realistic alternative for cyclists who must continue bicycle training in inclement weather;

(3) to provide a suitable exercising apparatus to help keep athletes in condition; and (4) to provide a device for those wishing to learn to ride a bicycle without the pain of falling off while learning.

With the foregoing and other objects in mind, my invention comprises constructions, combinations and arrangements of parts as hereafter described and illustrated in the accompanying drawings.

BRIEF DESCRIPTION OF THE DRAWINGS

FIG. 1 is a left side view of an indoor-rollbike apparatus model-1 with motion coordinator means M-1 and road-device unit R-1 constructed according to the principles of the invention.

FIG. 2 is a detailed illustration of the hidden component indicated by arrow 230 on FIG. 1.

FIG. 3 is a detailed illustration of the road tension adjuster indicated by arrow 220 of FIG. 1.

FIG. 4 is a fragmentary sectional detail illustrating, in an exploded manner, the hidden parts of the motion coordinator means M-1 indicated by arrow M-1 of FIG. 1.

FIG. 5 is a detailed illustration of the frame of the road device means R-1 indicated by arrow R-1 in FIG. 1.

FIG. 6 is another wheel-guide means, using omnidirectional rolling means 260-1 in place of smoothly polished side member-surface wheel-guide means indicated by arrow 260 on left and right side members 200-L and 200-R in FIG. 5.

FIG. 7 is another type of a wheel-guide means, using a different type of omni-directional rolling means 260-2 in place of smoothly polished side members wheel-guide means indicated by arrow 260 on left and right side members 200-L and 200-R in FIG. 5.

FIG. 8 is an illustration of a driven-wheel sprocket and variable gear-ratio means.

FIG. 13 is a left side view of an indoor-rollbike apparatus model-3 with motion coordinator means M-3 and road-device unit R-1 constructed according to the principles of the invention.

FIGS. 14A, 14B, 14C, 14D, 14E and 14F are a fragmentary sectional details illustrating the hidden parts of motion coordinator means M-3 and the catch-plates 80-3H of FIG. 13.

FIG. 18 is a left side view of an indoor-rollbike apparatus model-4 with motion coordinator means M-4, which is indicated by broken line and road-device unit R-5 and bike unit B-2 constructed according to the principles of the invention.

FIG. 19 is a fragmentary sectional detail illustrating the hidden parts of the seat assembly 820 in FIGS. 18 and 20 which let the seat be adjusted back and forth as well as up and down.

FIG. 20 is a left side view of an indoor-rollbike apparatus model-5 with motion coordinator means M-5 and road-device unit R-5 and bike unit B-3 constructed according to the principles of the invention.

DESCRIPTION OF THE PREFERRED EMBODIMENTS

INDOOR-ROLLBIKE APPARATUS MODEL-1

Figure 9:
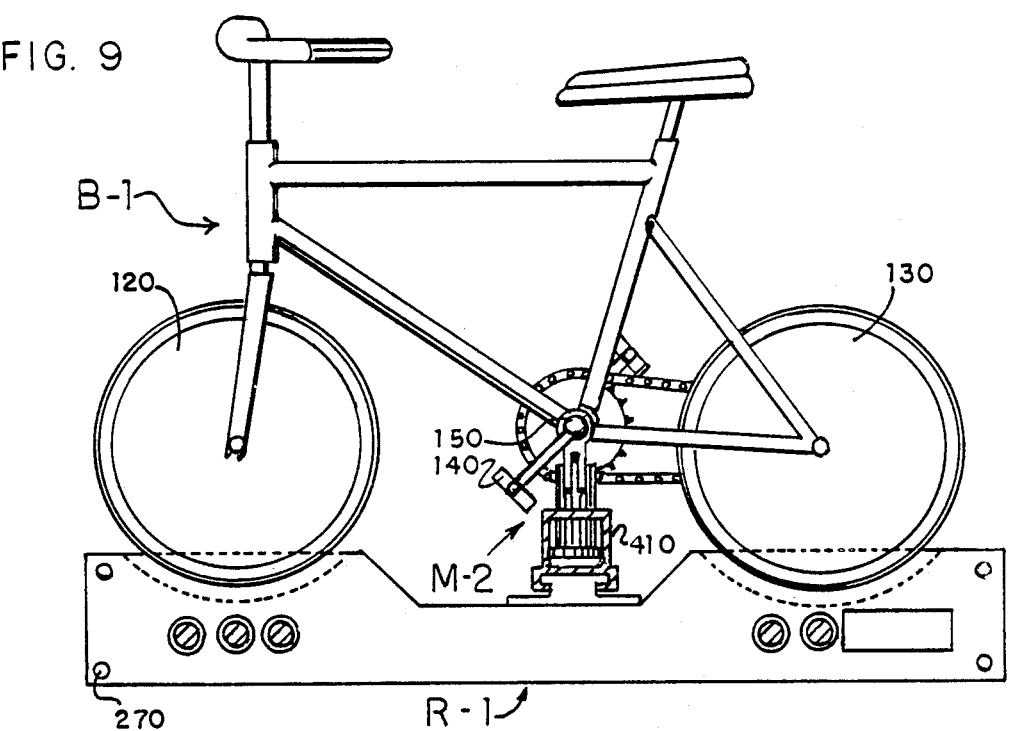
FIG. 9 is a left side view of an indoor-rollbike apparatus model-2 with motion coordinator means M-2 constructed according to the principles of the invention.

FIG. 1 shows the preferred embodiment of the indoor-rollbike apparatus model-1 comprising a bike unit B-1, a road device unit R-1, and a motion-coordinator means M-1 as viewed from the left side. The bike unit B-1 depicted therein is substantially similar to conventional bicycles.

BIKE UNIT B-1

As shown in FIG. 1, the bike unit B-1 comprises a top-tube member 10, a head-tube member 20 which has its upper rear portion firmly connected with the front end of the top-tube member 10, and a seat-tube member 30 which has its upper, front portion firmly attached to the rear end of the top-tube member 10. A down-tube member 40, which extends down and back, has its upper end firmly connected with the lower, rear portion of the head-tube member 20, and the lower end of the down-tube member 40 and the lower end of the seat-tube member 30 meet at and are connected to a pedal-crank housing 50. Left and right seat-stay members 60 extend down and back, and their upper ends are firmly attached to the left and right sides, respectively, of the upper portion of the seat-tube member 30. Left and right chain-stay members 70 have their front ends firmly attached to said crank-housing member 50. A pair of catch-plates represented generally by 80-1 and substantially larger than found on conventional bicycles, is provided at the junction where the lower ends of the seat-stay members 60 and rear ends of the chain-stay members 70 meet and are connected together. A seat and a seat post, represented generally by 90, is mounted in the seat-tube member 30. A handlebar assembly 100, and a front-fork assembly 110, are mounted on the head-tube member 20, whereby the handlebar can be rotated about the axis of the head-tube member 20 in order to steer the bike and to provide balance for the bike.

A front wheel 120 is mounted on the front fork assembly 110, and a driven wheel 130 with a driven wheel axle member 130-1 is mounted on the catch plates 80-1. The ends of the driven wheel axle member 130-1 are represented generally by 130-1P (see FIG. 4), and onto these is mounted a motion-coordinator means M-1, described in detail later. Pedal means 140 are mounted on a crank having a central axle shaft 150 rotatably mounted in the crank-housing 50; and means for transferring the rotational energy from the pedal means 140 to the driven wheel 130 is represented generally by 160 (see FIG. 8), as a chain and sprockets system.

As can be seen in FIG. 8, a multi-speed-gear-ratio means 170A and gear-shift levers 170B can be mounted on the chain-stay member 70 and on the down-tube member 40, respectively, and connected together by a flexible cable 170, in the manner of a standard bicycle derailleur system.

ROAD-DEVICE UNIT R-1

The components of the road-device unit R-1 are numbered starting from 200 and are illustrated in FIGS. 1, 2, 3, 5, 6, 7, and 12.

As shown in FIG. 5, the road device unit R-1 includes a pair of elongated longitudinal left and right side members 200-L,200-R attached firmly to transverse front and rear members 210-A,210-B, to form a durable 4-sided frame. Members 200-L,200-R and 210-A,210-B are preferably durable metal plates and may be welded together in a preferred method of fabrication.

The left and right side members 200-L,200-R have a plurality of transversely aligned openings containing suitably durable and well lubricated bearing retainers, represented generally by 200-L1,200-R1 as illustrated in FIG. 5. Rotatable members with axle shafts and sprockets, represented generally by 230 in FIG. 2 are mounted in the openings 200-L1 and 200-R1 of the side members. As shown in FIG. 1, a rotational force transferring means 240, preferably a chain member, is mounted about sprockets of the rotatable members 230. A road means 250 is looped about the rotatable members 230, forming a closed loop that spans between the left and right side members 200-L,200-R and comprises an endless treadmill upon which the bike unit can roll. The rotatable members 230 of the road means thus all rotate together, under the road means 250 and the wheels 120 and 130 of the bike unit B-1. The road means 250 may have an uneven surface (see FIG. 15B) comprised mainly of longitudinally extended high-and-low zones with some irregular bumps on each zone.

As shown in FIG. 5, a rectangular opening 200-L2 and holes 200-L3, and a rectangular opening 200-R2 and holes 200-R3, are provided on the left-side member 200-L and right-side member 200-R, respectively, for road-tension adjusting means 220 which is seen in FIG. 1 and FIG. 3. The road-tension adjusting means 220, fit into the rectangular openings 200-L2 and 200-R2 and preferably comprise a pair of plate 220P larger than the side member openings to overlie the side members and allow bolts 220-H to cooperate with holes 200-L3 and 200-R3 in side members 200-L and 200-R, respectively to mount the components together. The road-tension adjusting means 220 comprises a sliding member 221, which has connected to it an adjusting screw 222. The sliding member 221 has a hole with a suitable bearing retainer 221-H, similar in size to the holes 200-L1 and 200-R1 of the left and right side members 200-L and 200-R, respectively, and operable to rotatably hold one rotating member 230. Near the end where the adjusting screw 222 protrudes out of the road-tension adjusting means 220 is a stationary holding nut 223, whereby the sliding-member 221 slides back and forth relative to the plate when the adjusting screw 222 is turned. This serves to adjust the rotating member 230 mounted in the road tension adjusting means 220 also back and forth, thus adjusting the tension of the road means 250.

Wheel-guide means 260 are formed near the upper edges of the left and right side members 200-L,200-R, higher than the road means 250. The wheel guide means 260 may be polished smooth and rounded, and preferably friction reducing agents, such as silicone products or wax etc. may be applied over the surfaces where portions of the rotating wheel members 120 and 130 might contact.

In FIG. 6, an alternative wheel-guide means is illustrated, having well lubricated omni-directional rolling means, such as ball bearing members represented generally by 260-1, that are inserted in the wheel-guide holes 200-WGH on the side members 200-L,200-R, and part of each omni-directional rolling member will be exposed on the inner surface of the side member 200-L,200-R to contact the rotating wheels 120 or 130 and spin freely to reduce the friction against the wheel (s).

FIG. 7, another alternative type of wheel-guide means is illustrated, comprising well lubricated axle-roller members represented generally by 260-2, and each each axle-roller member will similarly spin about a radial axis through the approximate center of the rotating wheel when the wheel touches it, to reduce the friction against the wheel.

Each of the bike wheels 120 and 130 is adapted to ride the upper run of the endless adjacent road means 250. In the illustration of FIGS. 1 and 8, the rider may steer the bike unit B-1 from side to side freely between the oppsite side members; but even then the wheel (s) can rub against wheel-guide means 260, 260-1, or 260-2 formed on the side members, to remain on the road device unit R-1.

When riding on the road means 250, the front wheel will basically follow longitudinally along the high and low zones, but in steering will be typically directed laterally as well. This will cause the front wheel to ride from one high zone to the adjacent low zone and possibly then to the adjacent high zone. This transfer across the uneven heights of the adjacent longitudinally extended zones provides some feedback steering to the wheel itself, and causes the rider to assume an active part to compensate for this feedback steering in order to maintain the bike unit on a substantial longitudinal course along the treadmill. The local irregularities even further add to the realism of riding the bike on an outdoor bumpy roadway. As the endless treadmill is at least twice the wheel base of the bike unit, the same irregularities need not be hit by the front wheel (or by rear wheel) each time the treadmill rotates, as the wheel could be steered laterally to the side of the irregularity.

As shown in FIGS. 1, 5, 9, and 13, a stepping platform 200-S is mounted on the top of the middle portion of the left and right side members 200-L,200-R, covering with clearance the road means 250 that rolls underneath. This provides safety and protection for the rider who can stand on the platform to mount and dismount the bike unit B-1, rather than standing on the road means 250 which could accidentally move or be damaged by the rider's feet.

Figure 12:
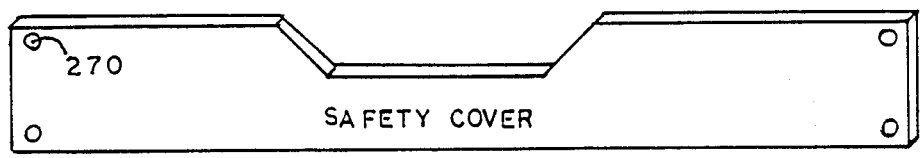
FIG. 12 is a safety cover 270, which will go on the left and right sides of the road device units for this invention.

FIG. 12 shows that the road device unit R-1 can have two safety covers 270, one each for the side members 200-L,200-R. These covers are preferably fastened by threaded means at the corners of the safety covers 270, as represented generally by 270-F.

MOTION-COORDINATOR MEANS M-1

The components of motion-coordinator means M-1 are illustrated in FIGS. 1 and 4, and will be represented by numbers starting from 300. The motion-coordinator means M-1 comprises bike-holding arms 300 at the front end, and tail arms 310 at the rear end. Near the end of each bike-holding arm 300 is a hole with a suitable bearing retainer, generally represented by 300-H, to be used for holding onto the bike unit, preferably at the driven-wheel axle member 130-1, shown in FIG. 1. The bike-holding arms 300 are mounted onto the ends 130-1, of the axle member 130-1, whereby the driven wheel 130 can rotate.

The transversal opening between the tail arms 310, is identified as 310-MOUTH. A transversal member 320 is inserted into the transversal opening 310-MOUTH, and through the left and right post members 330 at a hole 330-H formed in each at its upper end, and is held to the members such as by stop-screws. The post members 330 are mounted onto the side members 200-L,200-R as by being welded thereto. The transversal opening 310-MOUTH is larger than the diameter of the transversal member 320. A vertical axle with preferably a cylindrical bearing member, represented generally by 340, is mounted in the opening 310-MOUTH in order to keep the transversal member 320 from falling out.

The attached bike unit can be steered to move from side to side relative to the moving road means 250 and/or axially along the transversal member 320 without undue friction. Also, this motion coordinator means M-1 allows the bike unit B-1 to lean from side to side until the leaning is stopped by the transversal member 320 coming against the edges of the transversal opening 310-MOUTH. This motion-coordinator also allows the bike unit B-1 to go up and down as it rolls on the uneven surfaces of the moving road means 250 with longitudinally extended high-and-low zones.

Therefore, this system allows the bike unit to ride on the road device unit R-1, much as a bicycle riding on a road, although it does not allow the bike unit B-1 to fall down completely even if the rider fails to keep the bike in balance.

INDOOR-ROLLBIKE APPARATUS MODEL-2

Figure 10:
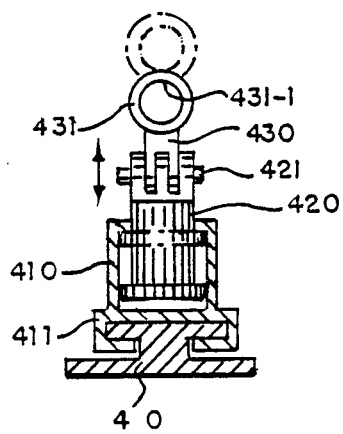
FIG. 10 is a fragmentary sectional detail illustrating the hidden parts of motion coordinator means M-2 viewed from the side of FIG. 9.
Figure 11:
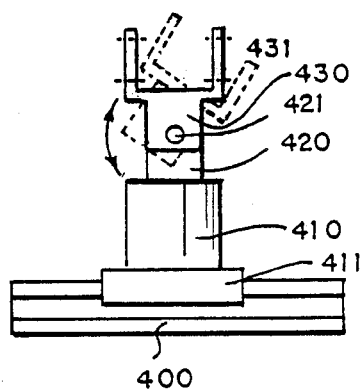
FIG. 11 is an illustration of motion coordinator means M-2 viewed from the front, as indicated by arrow M-2 of FIG. 9.

The indoor-rollbike apparatus model-2 in FIG. 9, is illustrated as having the bike unit B-1, the road-device unit R-1, and the motion-coordinator means M-2. The bike unit B-1 is similar to that already disclosed, except that the catch-plates 80-2 are of the size found on conventional bicycles. The motion-coordinator means M-2 is different in structure and where it is attached to both the bike unit B-1 and the road-device unit R-1 (see FIGS. 10 and 11), and can be seen in greater detail in FIGS. 10 and 11 where the components are numbered starting from 400.

The motion-coordinator means M-2 has a rail member 400, preferably in the shape of an I-beam, securely mounted onto the stepping platform 200-S of the road-device unit R-1, preferably by welding. An external cylinder member 410 has at its bottom a rail-holding means 411 which is shaped to be trapped on but axially slide along the I-beam shaped rail member 400 without falling off.

An internal cylinder member 420 is placed into the external cylinder member 410 so that it can be rotated and raised and lowered with respect to the external cylinder member 410. A bike holding means 430, hingedly connected by an axle 421 to the internal cylinder member 420, has at its upper end two bike holding arms each with an axle attaching opening and suitable bearing retainer 431-1, for holding the central axle shaft 150 of the bike pedaling crank. This allows the bike unit B-1 to see-saw with the motion-coordinator means M-2 as the fulcrum and with the bike wheels 120 and 130 on the road means 250. The bike unit B-1 can also lean from side to side due to the hinged internal cylinder member 420 and bike holding member 430, and can also be steered because the internal cylinder member 420 can rotate inside the external cylinder member 410. The bike unit B-1 can also be raised or lowered when it rolls on uneven surfaces of the moving road means 250, because of the telescoping internal cylinder member 420 and external cylinder member 410.

Therefore, this system allows the bike unit to ride on the road device unit R-1, much as a bicycle riding on a road, while preventing the bike unit B-1 from falling down completely.

INDOOR-ROLLBIKE APPARATUS MODEL-3

The indoor-rollbike apparatus model-3 illustrated in FIG. 13 and in FIGS. 14A, 14B, 14C, 14D, 14E and 14F, has the bike unit B-1, the road-device unit R-1, and a motion-coordinator means M-3. The road-device unit R-1 is the same as the road-device unit R-1 of the indoor-rollbike apparatus model-1, and the bike unit B-1 is similar to the bike unit B-1 of indoor-rollbike apparatus model-1, except that each catch-plate 80-3 contains a large opening 80-3H to receive a large cylindrical driven wheel axle means 130-3. The driven wheel axle means 130-3 is attached firmly onto the large catch-plates 80-3 as in conventional bicycles, and the driven-wheel 130 rotates about it.

The motion-coordinator means M-3 can be seen in greater detail in FIGS. 14A, 14B, 14C, 14D, 14E and 14F and the components will be numbered starting from 500.

A self-aligning means 500, preferably a spherical member having a center hole 500-H, is centered on cylindrical driven-wheel axle member 130-3, and is trapped by left- and right-side ball-cups 510; and the ball-cups are secured by stopper-rings 510-STP. The ball-cups 510 when assembled together define a ball-cup opening 510-H wider than the center hole 500-H of the self-aligning means 500 to allow limited swivel action of the self-aligning means.

An elongated bike-holding shaft 520 is inserted through the ball-cup opening 510-H of each ball-cup 510 and the center hole 500-H of the self aligning means. Left and right bike-supporting means 530 are mounted on the side members 200-L,200-R of the road device unit, preferably by welding, and each has a vertically aligned shaft holding hole 530-H on its upper portion. The end portion of each bike-holding shaft 520 is inserted into the shaft holding hole 530-H of the adjacent bike-supporting means 530.

Thus, the bike unit B-1 is allowed to lean to one side or the other and to be steered from side to side due to the self-aligning means 500 located within the cylindrical driven-wheel axle means 130-3; and the bike-holding shaft 520 can move up and down in the vertically aligned shaft-holding holes 530-H on the bike-supporting means to allow the bike unit B-1 go up and down when it rolls on the uneven surfaces of the road means 250.

The bike unit B-1 is kept from falling down completely by the bike holding shaft 520 coming up against the edges of the ball-cup opening 510-H, or the stopper-ring 510-STP, and the bike-holding shaft 520 being limited by the shaft-holding holes 530-H.

ROAD-DEVICE UNIT R-2

Figure 15A:
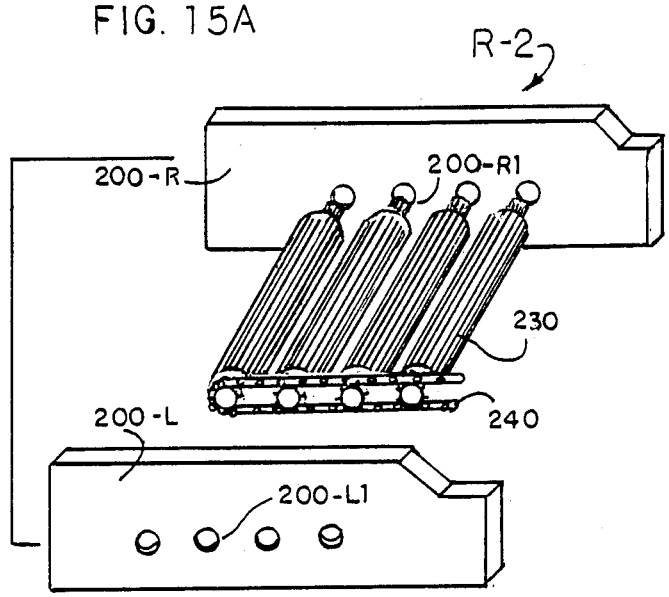
FIG. 15A is a fragmentary sectional detail illustrating, in exploded manner, the hidden parts of the road device unit R-2 viewed from the side.
Figure 15B:
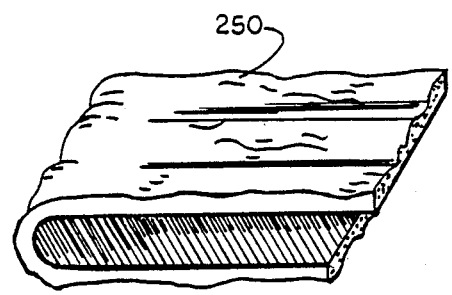
FIG. 15B is a fragmentary sectional detail illustrating one embodiment of the road means of the drawings.

The road-device unit R-2 illustrated in FIG. 15A, is similar to the road-device unit R-1 with the exception that the rectangular openings 200-L,200-R2 and the holes 200-L3,200-R3 shown in FIG. 5, and the road-tension adjusting means 220 and the road means 250 shown in FIG. 1 are not present. Therefore, instead of the wheels 120 and 130 of FIG. 1 rolling on the road means 250, they will roll directly on the rotatable members 230. A chain member 240 riding over sprockets keyed to each of the rotatable members drives the rotatable members in unison.

ROAD-DEVICE UNIT R-3

Figure 16:
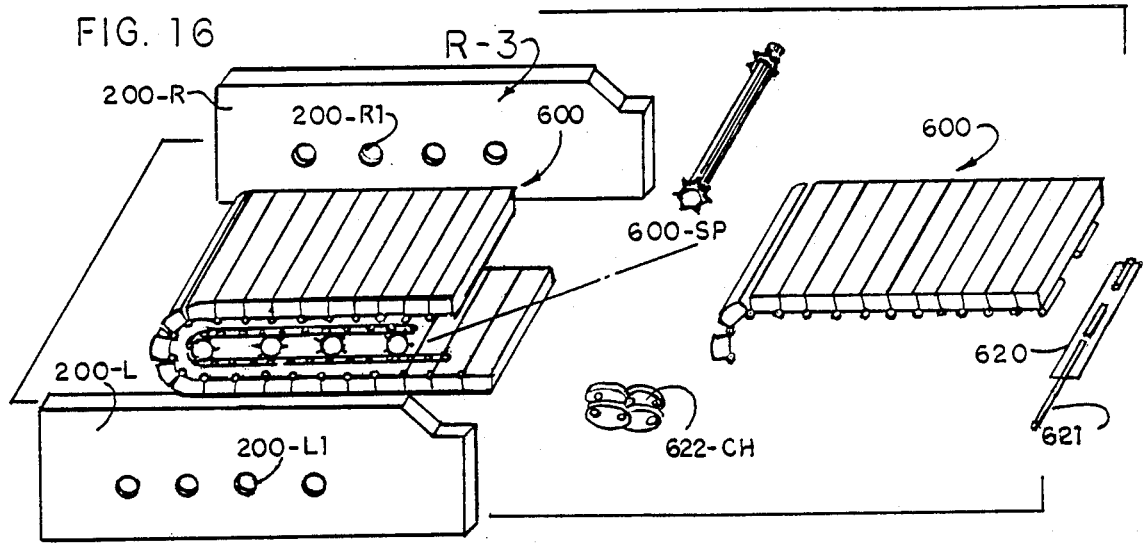
FIG. 16 is a fragmentary sectional detail illustrating, in an exploded manner, the hidden parts of another embodiment of the road device.

FIGS. 16A and 16B illustrate the road-device unit R-3, and the components which are in addition to or different from the components of the road-device unit R-1 will be numbered starting from 600.

The road-device unit R-3 is similar to the road-device unit R-1 of FIGS. 1 and 5 except that the rectangular openings 200-L2, 200-R2, the holes 200-L3,200-R3, and the road-tension adjusting means 220 are not present. In addition, the rotatable members 230 are replaced with rotating sprocket members 600-SP keyed to the opposite ends of the shaft means each rotated in the durable bearing retainers, represented by 200-L1,200-R1 in the side members 200-L, 200-R. The driving chain means 240 and the road means 250 are replaced by right and left chain members 600-CH and the segmented-road means 600 that spans between the left and right side members 200-L and 200-R. The segmented-road means 600 is composed of individual road segments 610 whose cross-sections are preferably rectangular, and adjacent road segments 610 are joined by hinging means 620 with hinging axle pins 621 of the adjacent chain member 600-CH. The hinging axle pins 621 also link the members 622 of the chain members 600-CH on each side of the segmented road means 600. This segmented-road means 600 is mounted on the rotating sprocket members 600-SP.

ROAD-DEVICE UNIT R-4

Figure 17:
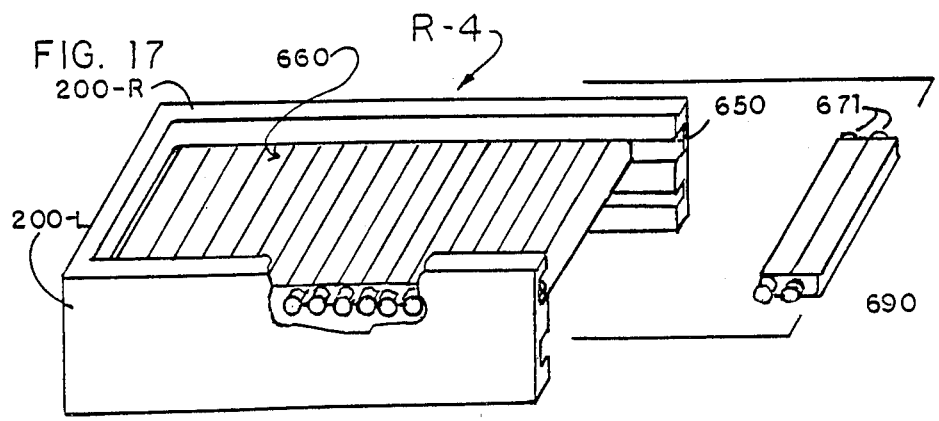
FIG. 17 is a fragmentary sectional detail illustrating, in an exploded manner, the hidden parts of another embodiment of the road device unit.

The road device unit R-4 is illustrated in FIG. 17, and the components which are in addition to or different from the components of the road-device unit R-1 will be numbered starting from 650.

In the road-device unit R-4, there are no transversely aligned openings 200-L1, 200-R1, rectangular openings 200-L2,200-R2, and holes 200-L3,200-R3, and the road-tension adjusting means 220, the rotatable members 230, the rotational energy transferring means 240 and the road means 250 are removed. Instead, the side members 200-L, 200-R, each is provided with a track opening 650 in the shape of a closed loop, preferably an oval. Into these track openings 650 are placed an axled-segmented road means 660 spanning between the side members 200-L, 200-R, and forming a complete loop. The axled-segmented road means 660 includes individual axled-road segments 670, whose cross-sections are preferably rectangular, each of which has a segment axle, preferably with cylindrical bearing at each end represented generally by 671. The cylindrical bearings will reduce the friction when the axle-segmented road means roll along the track openings 650. The adjacent axled-road segments 670 are joined together by hinging means 690 to follow the oval track opening 650. The powered rear wheel 130 of the bike unit will rotate the road means 660, while the front wheel 120 rolling freely on the road members can then be used to steer the bike unit on the road means.

INDOOR-ROLLBIKE APPARATUS MODEL-4

An indoor-rollbike apparatus model-4, illustrated in FIG. 18, has bike unit B-2, road device unit R-5 and motion coordinator means M-4. This bike unit B-2 is meant for a rider who does not desire to balance the bike unit while exercising, and does not have a front wheel and the handlebars do not steer, as in conventional bicycles.

The components of the indoor-rollbike apparatus model-4 will be represented by numbers starting from 700.

Figure 21:
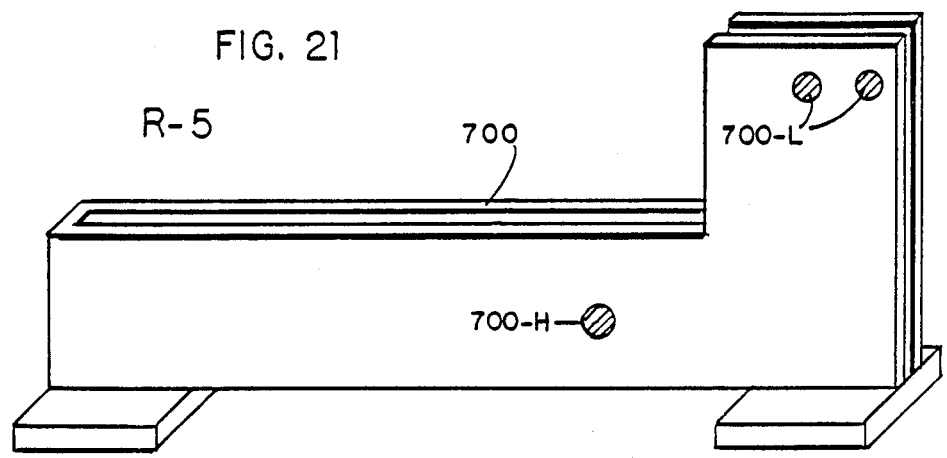
FIG. 21 is a fragmentary sectional detail illustrating, the hidden parts of the road device unit R-5 of FIGS. 18 and 20.

The road-device unit R-5 has two substantially parallel L-shaped road frame members 700, each having an opening 700-H shown in FIG. 21 and an axled rotating-road means 710, preferably a flywheel, is mounted into the opening 700-H. The bottom of the road frame members 700 are attached to transversal support members 720 respectively disposed near the front and rear portions of the road device unit R-5 attached as by welding to stabilize the road device unit R-5.

Motion coordinating openings 700-L are provided at the top of the rear section of each road frame member 700 for receiving the bike unit B-2.

Figure 22:
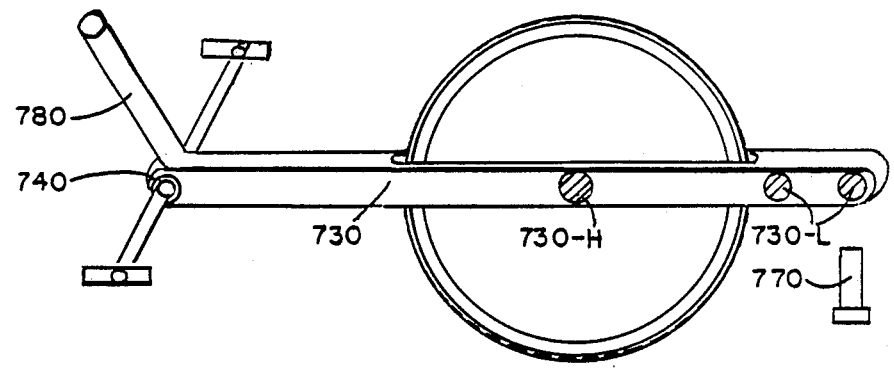
FIG. 22 is a fragmentary sectional detail illustrating the hidden parts of the main member 730 of the bike frame of the bike unit B-2 of the FIG. 18.

The bike unit B-2 has a pair of longitudinally elongated main members 730. A pedal-crank housing 740 is provided on the front end of the main members 730, and a pair of pedals 750 having a driving sprocket 755 is mounted in the pedal crank-housing 740 as on conventional bicycles. Near the middle of each main member 730 an axled-wheel member opening 730-H, shown in FIG. 22, is provided; and an axled wheel member 760 having a driven sprocket 762 is mounted rotatably in place as on conventional bicycles. A chain member 765 is placed around the driven sprocket 762 and the driving sprocket 755 to carry the rotational force from the pedals 750 to the axled-wheel member 760. Axle-pin member openings 730-L at the rear end of each main member 730 provide for linking the bike unit B-2 to the road unit R-5, by an axle pin member 770 being inserting through these oppenings and the motion coordinating openings 700-L.

A head-tube member 780 is connected to the pedal crank housing 740, and the head tube member 780 carries conventional handlebars 790. The top of the head-tube member 780 is connected to an upper member 800 whose rear portion connects to an upper portion of a seat-tube member 810. The lower portion of the seat-tube member 810 is connected to the main member 730, and a seat assembly 820 is carried in the seat-tube member 810.

As shown in FIG. 19, the seat assembly 820 can be raised and lowered as on conventional bicycles. A seat member 821, part of the seat assembly 820, has as at its lower portion a sliding member 822 which can fit onto the rail member 823 such that the seat member 821 can slide back and forth along the rail member 823 without falling off. A locking member 824, preferably a threaded device, can be locked to keep the seat member 821 as adjusted, or can be released to adjust the seat position.

This indoor-rollbike apparatus model-4 carries the rider's weight upon the axled-wheel member 760 which presses on the rotating-road means 710. The difficulty level can be adjusted by inserting the axle-pin member 770 into different motion-coordinating openings 700-L and corresponding axle-pin member openings 730-L, to vary the moment arm distance from the axled-wheel member 760 to the axle-pin member 770, which acts as the fulcrum point, thereby producing varying pressures between the wheel member 760 and road means 710 with the same rider's weight. As there is no front wheel, the force the rear wheel 760 applies against the road means 710 can be magnified to exceed the rider's weight, depending on the moment arm locations of the distances between the seat assembly 820, the wheel-road device contact area, and axle-pin member 770.

In this particular indoor-rollbike apparatus model-4, the axle-pin member 770 is the motion-coordinating means M-4.

INDOOR-ROLLBIKE APPARATUS MODEL-5

FIG. 20 shows an indoor-rollbike apparatus model-5, having bike unit B-3, road-device unit R-5 and a motion coordinator means M-5. The different or additional components of the bike unit B-3 will be represented by numbers starting from 900.

Figure 23:
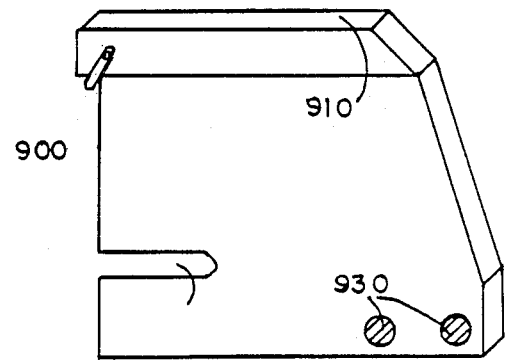
FIG. 23 is a fragmentary sectional detail illustrating the hidden parts of the wheel-holding member 900 of the frame of the bike unit B-3 of the FIG. 20.
Figure 24:
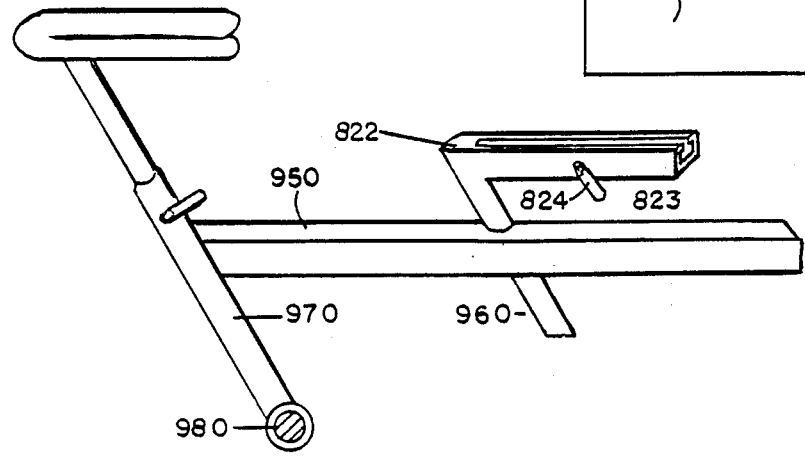
FIG. 24 is a fragmentary sectional detail illustrating the hidden parts of the upper member 950 of the frame of the bike unit B-3 of the FIG. 20.

The bike unit B-3 has a pair of 4-sided wheel-holding members 900. A horizontally aligned main support member 910, preferably having a rectangular cross-section, is firmly joined to the top of the wheel-holding members 900, as by welding. As shown in FIG. 23, wheel-catch plates 920 are at the lower front end of the wheel-holding members 900, and axle-pin member openings 930 are at the lower rear portion of each wheel-holding member 900. An axled-wheel member 940 with a driven sprocket member 942 and a spring-loaded chain-tension adjusting means 944, shown in FIG. 20, are mounted onto the wheel-holding members 900. The axled-wheel member 940 is placed directly above and rests on the rotating-road means 710 of the road-device unit R-5.

An upper member 950, preferably having a rectangular cross-section, is inserted into the main support member 910, thereby allowing the upper member 950 to slide in and out of the main support member 910. The upper member 950 can be locked in any adjusted position by a main-locking means 955, preferably in the form of a threaded member which can be tightened.

Toward the rear of this upper member 950 is firmly joined a seat-tube member 960. The seat assembly 820 is mounted onto the seat tube member 960 and can be raised and lowered as on a conventional bicycles. A seat member 821, part of the assembly 820, has sliding member 822 which can fit onto the rail member 823 to slide back and forth along the rail member 823 without falling off. A locking member 824, can be locked to keep the seat member 821 from moving from any adjusted position or can be released to adjust the seat position.

The upper portion of a head-tube member 970 is firmly attached to the front portion of the upper member 950, and handlebars 975 are attached to the head-tube member 950. The bottom portion of the head-tube member 970 forms a pedal-crank housing 980, to which are mounted pedals 985 and a driving sprocket 990 as on conventional bicycles.

A conventional drive chain member 995 is placed around the driving sprocket 990, the driven sprocket 942 and the chain-tension adjusting means 944 to transfer the pedaled force to the axled-wheel member 940. The chain-tension adjusting means 944 is used to keep the chain member 995 tight when the upper member 950 has been moved to any adjusted position.

The axle-pin member 770 is inserted into the axle-pin member openings 930 of the wheel-holding members 900 shown in FIG. 23 and the motion-coordinating openings 700-L of the road-device unit R-5 in order to join the road-device unit R-5 and the bike unit B-3 together.

This indoor-rollbike apparatus model-5 carries the rider's weight upon the axled-wheel member 940 which presses on the rotating-road means 710 of the road-device unit R-5. As noted above with respect to the model-4 in FIG. 18, by adjusting the horizontal moment arm distance from the seat member 821 to where the wheel-holding members 900 are connected to the road-device unit R-5, the force of the wheel 940 pressing on the rotating-road means 710 of the road-device unit R-5 can be varied, even to the extent to exceed the weight of rider.

It may be noted that in all of the disclosed devices, the wheels and frictionally coupled rotatable members of the road device unit can be of durable material, and of suitable weight, to provide a gyroscopic rotational effect. Thus, when the rider stops pedaling, the wheels and rotatable road device will continue to roll for some time to give the feeling of coasting on a real bicycle. Moreover, as the rider transmits a force against the road device related to his/her own weight, the degree of difficulty in rotating the rotatable means is automatically adjusted somewhat to the weight of the rider.

With respect to the treadmill model R-1, the front and driven wheels of the illustrated bike units, being supported on and frictionally coupled to the rotatable means of the road device unit, give a feel similar to one actually riding a bicycle, as vibrations from or bumps on the road device are transmitted to the bike unit itself, including to the seat.

While the above description contains many specifics, the reader should not construe them as limitations on the scope of this invention, but merely as preferred embodiments thereof. Those skilled in the art will readily be able to change the dimensions and shapes of the various embodiments, and build from alternative materials. Accordingly, the scope of the invention is to be determined by the appended claims and their legal equivalents, and not by the examples which have been given.

I claim:

1. Indoor exercising apparatus for use with a conventional rider-powered bike unit having a frame and having spaced front steering and rear drive wheels supported by the frame at a wheel base, the exercising apparatus comprising the combination of
   a road device unit having a stationary frame structure including laterally spaced sides, and a non-powered substantially free-wheeling endless treadmill supported relative to the frame structure and defining a generally exposed upper run extended laterally between the spaced sides and longitudinally a distance greater than the wheel base of the bike unit, whereby both wheels of the bike unit may be simultaneously supported by and frictionally coupled to the upper treadmill run;
   motion-coordinator means coupling said bike unit frame relative to the frame structure, with both wheels simultaneously supported on the treadmill, operable to hold the bike unit substantially fixed longitudinally on the treadmill while allowing unrestricted lateral steering movement of the bike unit; and
   said motion-coordinator means including a transverse member on said frame structure disposed laterally of and elevated above the upper treadmill run, longitudinally extended bar means, means connecting the bar means at its front end relative to the bike unit frame in the region where the rear wheel is connected to the bike unit frame, and means coupling the bar means at its rear end to the transverse member and including means to allow limited twisting movement of the bike unit relative to the transverse member to limit bike unit tilting relative to the treadmill while precluding the bike unit from falling and including anti-friction means in the form of a roller mounted to rotate about its longitudinal axis relative to the longitudinally extended bar means, which axis is also angled transverse to the transverse member, adapted to engage and roll along the transverse member for allowing unrestricted lateral steering movement of the bike unit;
   whereby the rider may power the drive wheel, to move the treadmill longitudinally, without the bike unit moving longitudinally off of the treadmill, and the rider may steer the front wheel laterally of the treadmill and balance the bike unit as in riding on a real road surface.

2. An indoor-rollbike exercising apparatus according to claim 1, further including a stepping platform spanning between and mounted on the frame structure sides and overlying and covering the upper treadmill run with clearance in the region between where the bike unit wheels engage the treadmill, operable to allow the rider to stand on the platform and not the treadmill in mounting or dismounting the bike unit; and further including lateral stop means supported by and relative to each frame structure side, above the upper treadmill run and near the lateral edge thereof and adjacent the front wheel, adapted to be engaged by circumferential side portions of the front wheel steered close to the lateral edge of the treadmill, and said lateral stop means being in the form of a plurality of small and independent anti-friction means supported spaced apart from one another and operable to rotate about axes extended radially through the approximate center of the front wheel, so that several anti-friction means may be engaged simultaneouly by the front wheel to prevent the front wheel from riding off of the treadmill and without binding against the front wheel.

3. An indoor-rollbike exercising apparatus according to claim 1, further including said endless treadmill having local surface irregularites corresponding to bump and/or hole means of a conventional road surface, whereby the rolling bike unit wheels occasionally will roll over the irregularities to produce a feel of riding the bike unit outdoors on an irregular road surface.

4. An indoor-rollbike exercising apparatus according to claim 2, further including said endless treadmill having local surface irregularites corresponding to bump and/or hole means of a conventional road surface, whereby the rolling bike unit wheels occasionally will roll over the irregularities to produce a feel of riding the bike unit outdoors on an irregular road surface.

5. Indoor exercising apparatus for use with a conventional rider-powered bike unit having a frame and having spaced front steering and rear drive wheels supported by the frame at a wheel base, the exercising apparatus comprising the combination of a road device unit having a stationary frame structure including laterally spaced sides, and a non-powered substantially free-wheeling endless treadmill supported relative to the frame structure and defining a generally exposed upper run extended laterally between the spaced sides and longitudinally a distance greater than the wheel base of the bike unit, whereby both wheels of the bike unit may be simultaneously supported by and frictionally coupled to the upper treadmill run;

motion-coordinator means coupling said bike unit frame relative to the frame structure, with both wheels simultaneously supported on the treadmill, operable to hold the bike unit substantially fixed longitudinally on the treadmill while allowing unrestricted lateral steering movement of the bike unit and limited bike unit tilting relative to the treadmill;

whereby the rider may power the drive wheel, to move the treadmill longitudinally, without the bike unit moving longitudinally off of the treadmill, and the rider may steer the front wheel laterally of the treadmill and balance the bike unit as in riding on a real road surface; and lateral stop means supported by and relative to each frame structure side, above the upper treadmill run and near the lateral edge thereof and adjacent the front wheel, adapted to be engaged by circumferential side portions of the front wheel steered close to the lateral edge of the treadmill, and said lateral stop means being in the form of a plurality of small and independent anti-friction means supported spaced apart from one another and operable to rotate about axes extended radially through the approximate center of the front wheel, so that several anti-friction means may be engaged simultaneously by the front wheel to prevent the front wheel from riding off of the treadmill and without binding against the front wheel.

6. An indoor-rollbike exercising apparatus according to claim 5, further including a stepping platform spanning between and mounted on the frame structure sides and overlying and covering the upper treadmill run with clearance in the region between where the bike unit wheels engage the treadmill, operable to allow the rider to stand on the platform and not the treadmill when mounting and dismounting the bike unit.

* * * * *